O. J. NEAL & H. B. GILLETTE.
CHURN.
APPLICATION FILED MAR. 9, 1909.
926,760.
Patented July 6, 1909.
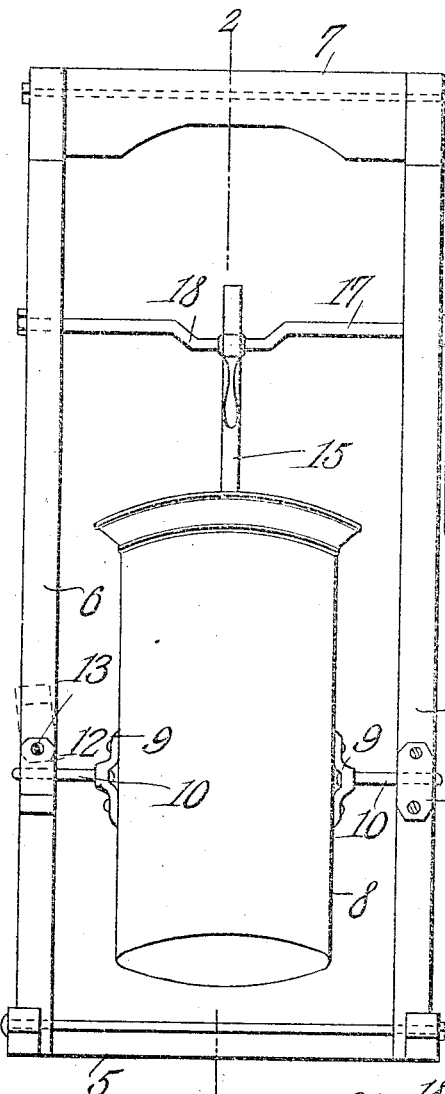
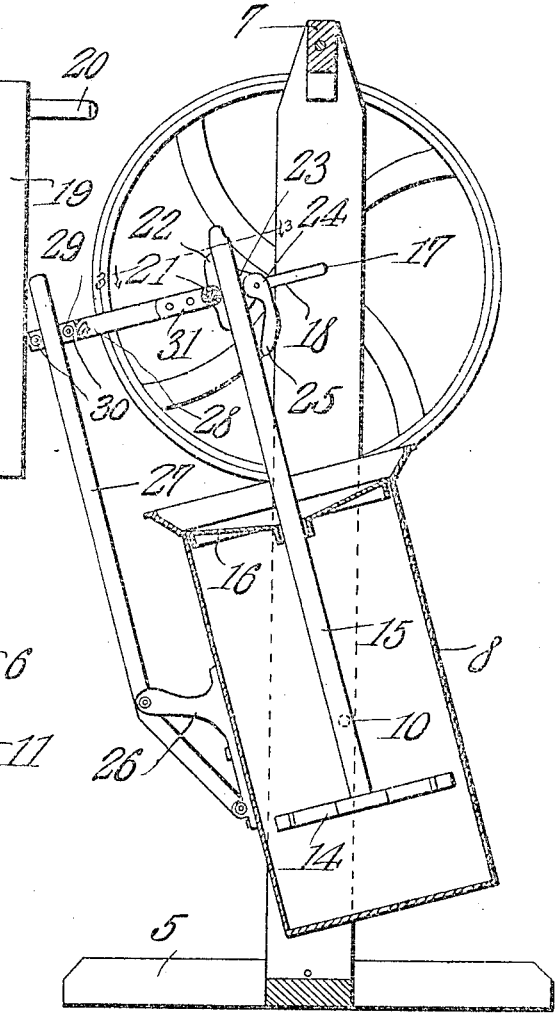
Inventors
Oscar J. Neal and
Hiram B. Gillette

UNITED STATES PATENT OFFICE.

OSCAR J. NEAL AND HIRAM B. GILLETTE, OF ECHO, OREGON.

CHURN.

No. 926,760.      Specification of Letters Patent.      Patented July 6, 1909.

Application filed March 9, 1909. Serial No. 482,258.

*To all whom it may concern:*

Be it known that we, OSCAR J. NEAL and HIRAM B. GILLETTE, citizens of the United States, residing at Echo, in the county of Umatilla and State of Oregon, have invented a new and useful Churn, of which the following is a specification.

This invention relates to improvements in the churn shown in Patent No. 890,165, dated June 9th, 1908, the same being characterized by a rocking churn body, and a reciprocating dasher working therein, the churn body being rocked simultaneously with the reciprocation of the dasher.

The object of the present invention is to improve and simplify the churn, in order that it may be more readily and cheaply manufactured, and to this end, the invention consists in a novel construction and arrangement of parts, to be hereinafter described and claimed, reference being had to the drawing hereto annexed, in which:—

Figure 1 is a front elevation of the churn. Fig. 2 is a vertical section on the line 2—2 of Fig. 1. Fig. 3 is a sectional detail on the line 3—3 of Fig. 2.

Referring more particularly to the drawing, the supporting frame of the churn comprises a base 5, and spaced uprights 6 rising therefrom, and connected at their upper ends by a cross-bar 7. The churn body or receptacle 8 is cylindrical in form, and to opposite sides thereof are secured brackets 9 from which project trunnions 10, whereby said receptacle is pivotally mounted between the uprights 6, so that it may rock back and forth in a vertical plane. The uprights are provided with bearing openings to receive the trunnions, one of said openings being closed by a plate 11, and the other opening being closed by a latch 12 which is pivoted at 13 to the upright, so that it may be swung away from the opening, as shown by dotted lines in Fig. 1. When the latch is thus swung away, the bearing opening in the upright 6 is uncovered, and the trunnions may be mounted in place, or removed.

In the receptacle 8 works a reciprocating dasher 14, provided with a stem 15, which extends through an opening in the lid or cover 16 of the receptacle.

Above the receptacle 8 a shaft 17 is mounted in suitable bearings in the uprights 6, and said shaft has a crank 18, and also a balance wheel 19 provided with a handle 20.

Reciprocatory movement is imparted to the dasher 14 by connecting the stem 15 to the crank 18. The connection is made as follows: On the crank is loosely mounted a sleeve 21 formed with lugs 22 and projecting ears 23, between which ears a cam 24 is pivotally mounted. The dasher stem 15 is received between the lugs and the cam, and upon actuating the latter, the dasher stem is securely fastened to the sleeve, and thus connected to the crank. The cam is provided with a handle 25 for operating the same. Upon releasing the cam the dasher stem may be adjusted vertically in order to set the dasher according to the amount of milk in the receptacle.

To the receptacle 8 is rigidly secured a bracket 26 to which a stem 27 is fastened, the outer end of which has loose connection with a lever 28, said lever having a slot 29 through which the stem loosely passes, and in said slot are anti-friction rollers 30 between which the stem works. The lever is rigidly connected at the opposite end to the sleeve 21, said sleeve being provided with projecting ears 31 between which said end of the lever is received and fastened by transverse bolts or other suitable means.

In the operation of the churn, the shaft 17 is rotated by means of the handle 20, and through the crank 18 the dasher 14 is reciprocated, and at the same time the receptacle 8 is rocked on its trunnions through the lever 28 and the stem 27. The lever 28 is arranged so as to extend at right angles to the dasher stem 15, and the stem 27 extends parallel to said dasher stem at all positions of the same and the receptacle. During the operation of the churn, the stem 27 works up and down in the slot of the lever 28, binding therein being effectually prevented by the anti-friction rollers 30, and this arrangement of parts entirely overcomes side friction of the dasher stem in the opening of the lid 16 through which it passes. It will be seen in Fig. 2 that the pivotal support 10 of the receptacle 8 is not in perpendicular alinement with the axis of the shaft 17, but is located slightly to one side thereof. The object of this arrangement is to permit the hereinbefore described vertical adjustment of the dasher stem 15.

What is claimed is:

1. A churn comprising a supporting frame including spaced uprights, a receptacle pivotally mounted between the uprights, a reciprocating dasher and its stem, a stem secured to the receptacle, a crank shaft, a sleeve loosely mounted on the crank, a clamp carried by the sleeve for connecting the dasher stem thereto, and a lever rigidly secured to said sleeve and having a sliding connection with the aforesaid stem.

2. A churn comprising a supporting frame including spaced uprights, a receptacle pivotally mounted between the uprights, a reciprocating dasher and its stem, a stem secured to the receptacle, a crank shaft, a sleeve loosely mounted on the crank, a clamp carried by the sleeve for connecting the dasher stem thereto, a lever rigidly secured to said sleeve, and having a slot through which the stem which is secured to the receptacle passes, and anti-friction rollers in said slot on opposite sides of the stem.

3. A churn comprising a supporting frame including spaced uprights, a receptacle pivotally mounted between the uprights, a reciprocating dasher and its stem, a stem secured to the receptacle, a crank shaft the axis of which is out of vertical alinement with the pivotal axis of the receptacle, a sleeve loosely mounted on the crank, means for connecting the dasher stem to the sleeve, and a lever rigidly secured to the sleeve, and having a sliding connection with the stem which is secured to the receptacle.

In testimony that we claim the foregoing as our own, we have hereto affixed our signatures in the presence of two witnesses.

OSCAR J. NEAL.
HIRAM B. GILLETTE.

Witnesses:
F. R. DORN,
O. J. CAMPBELL.